(No Model.) 2 Sheets—Sheet 1.

G. A. SQUIRE.
REVERSING MECHANISM.

No. 583,825. Patented June 1, 1897.

Witnesses
E. E. Overholt
M. M. Watson

G. A. Squire
Inventor
By W. T. FitzGerald
Attorneys (No Model.) 2 Sheets—Sheet 2.
G. A. SQUIRE.
REVERSING MECHANISM.
No. 583,825. Patented June 1, 1897.
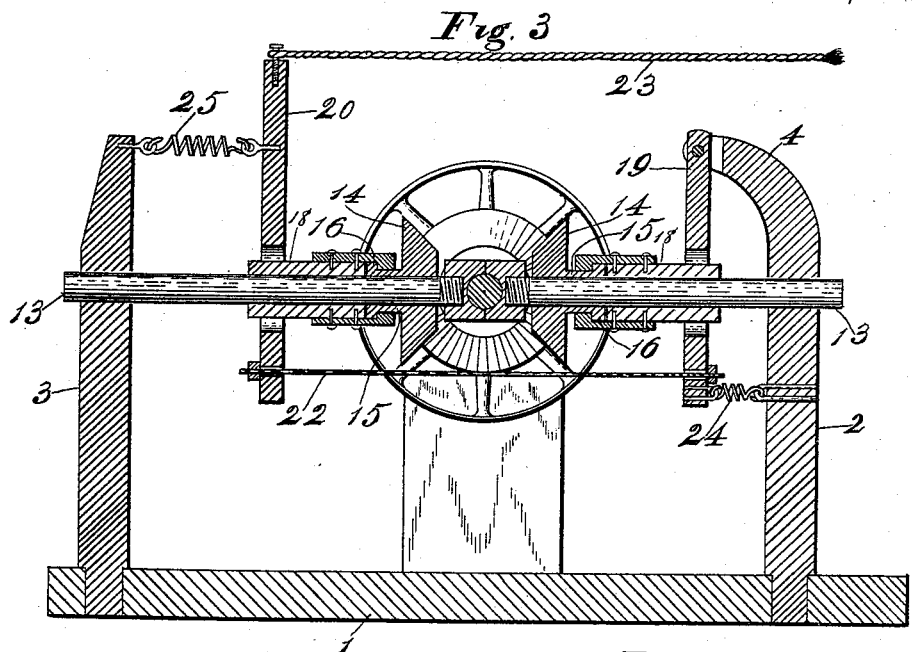
Witnesses
E. E. Overholt
M. M. Watson
G. A. Squire
Inventor:
By W. T. FitzGerald &c.,
Attorneys.

UNITED STATES PATENT OFFICE.

GEORGE A. SQUIRE, OF BAYS, OHIO.

REVERSING MECHANISM.

SPECIFICATION forming part of Letters Patent No. 583,825, dated June 1, 1897.

Application filed October 17, 1896. Serial No. 609,182. (No model.)

*To all whom it may concern:*

Be it known that I, GEORGE A. SQUIRE, a citizen of the United States, residing at Bays, in the county of Wood and State of Ohio, have invented certain new and useful Improvements in Reversing Mechanism; and I do hereby declare the following to be a full, clear, and exact description of the invention, such as will enable others skilled in the art to which it appertains to make and use the same.

My invention has relation to improvements in reversing mechanism which, while especially valuable and applicable for use upon gas-engines employed for actuating drilling machinery and the like, will be found valuable when applied to use upon an engine of any description where it is desired to reliably reverse the application of the power.

The object of my invention is to provide a reversing mechanism for engines which will at all times reliably perform its functions and at the same time reduce to a minimum the strain or jar incident to such reversal of movement of the parts.

In carrying out my invention I employ what are termed "conical friction-clutches," which, while acting gently at first upon the parts of the mechanism to be reversed, finally positively engage therewith and result in the reverse movement desired.

The details of my invention will be hereinafter fully set forth, and illustrated in the accompanying drawings, made a part of this application, in which—

Figure 2:
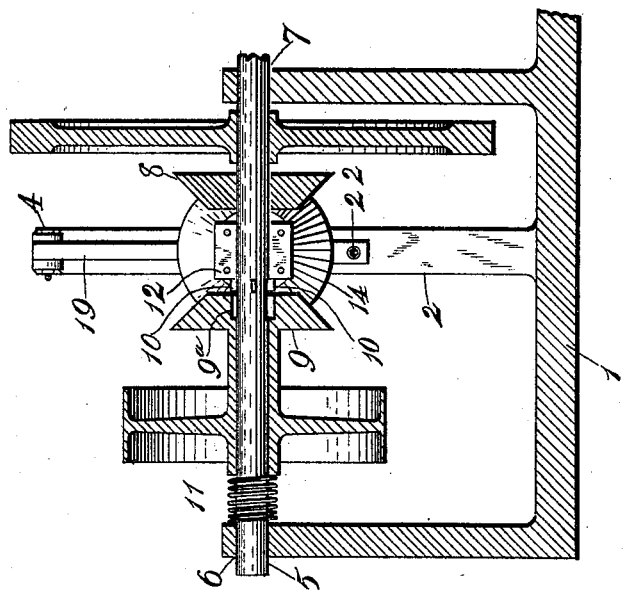
Figure 1:
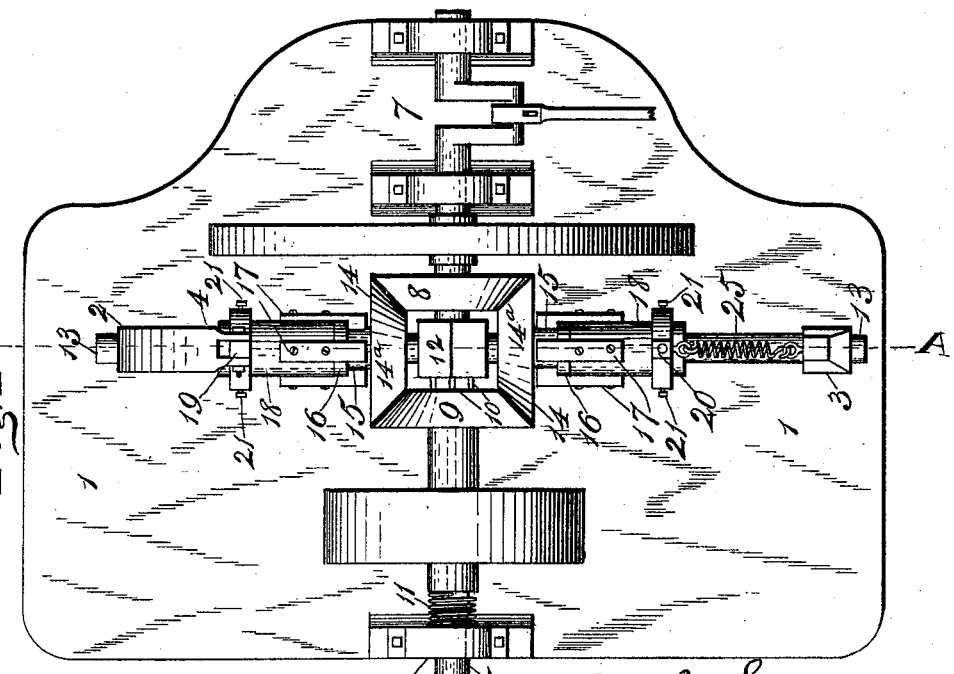

Figure 1 is a top plan view of my reversing mechanism, showing the cones thrust toward each other and such portions of the gas-engine as are deemed necessary to show the relative arrangement and interdependence of the parts. Fig. 2 is a sectional view of Fig. 1 on a line with the driving-shaft. Fig. 3 is a sectional view of Fig. 1 on line A A. Fig. 4 is an enlarged detail perspective view of one of the friction-cones and its actuating sleeve and lever.

For convenience of referring to the various details involved reference will be had thereto by figures, the same figure referring to the same part throughout.

In carrying out my invention I erect upon the engine bed or frame 1 the standards 2 3, the former provided with the inwardly-extending arm or bracket 4, the purpose of which will be hereinafter set forth.

The driving-shaft 5 of the engine is mounted in suitable bearings 6 7 in the usual manner and is provided with the beveled disk 8, which is rigidly feathered or secured to said shaft in any effective and preferred manner and is also provided with a pulley 9, loosely mounted upon said shaft, and would be what is termed an "idler" were it not for the clutch 10 and the spiral spring 11, which I will refer to in detail.

Intermediate the fixed disk and the loosely-mounted pulley just referred to is the bearing-block 12, enabling the shaft 5 to rotate freely therein, yet providing a reliable support for the inner ends of the shafts 13. Said shafts 13 are seated rigidly in said bearing on a line with each other and extend outward to the standards 2 3, where they are rigidly seated and secured against reverse or longitudinal movement. Upon said shafts 13 the friction-cones 14 are loosely mounted and are adapted to have a free reciprocatory or longitudinal movement thereon. In the construction of said cones 14 I prefer to provide them with the conical face or head 14ª and the outer extension or neck 15, which latter terminates in the rib or collar 16. By this construction said necks are provided with a seat which is engaged by the fingers 17, extending past the collar 16 and clutching therewith, as shown. Said fingers 17 are fixed to the sleeve 18 in any preferred manner or may be integrally formed therewith, if desired, while said sleeve is provided with a sufficient bore to enable it to freely rotate upon the shaft 13 and have a reciprocating movement thereon when the cones are forced toward each other or withdrawn.

In order to simultaneously reciprocate the sleeves and their accompanying friction-cones, I provide the operating-levers 19 20, the former being pivotally connected at its upper end with the inwardly-extending arm 4, provided upon the standard 2. Said levers are adapted near their lower ends to loosely encircle the sleeves 18, to which they are pivotally secured at either side by means of the bearings 21, or, if preferred, said sleeves may be provided with laterally-extending journals adapted to enter apertures or bearings provided at a contacting point of the encircling portion of the levers.

The openings provided in the levers for the reception of the sleeves, and just referred to, should be somewhat elliptical in form, admitting sufficient play between the sleeves and the encircling portion of the levers and thus enabling the latter to be easily operated without undue strain or friction.

The lower ends of the levers are connected by means of the rod 22, and it will be seen that after a proper adjustment of these parts has been made the inward movement of the upper end of lever 20 will result in an inward movement of lever 19, thereby causing the friction-cones to be brought toward each other upon the shafts 13 and enter firmly and positively between the friction-disk and the pulley 9. It will be understood that said pulley 9 may be provided with any preferred form of clutch which will cause it to move with its shaft, yet permit a reverse movement thereon. While any preferred form of clutch may be employed for this purpose, I prefer to use the means which I will now proceed to describe. Upon the driving-shaft 5 I provide the ribs or keys 10, preferably formed integral with said shaft and which lie in a direction parallel therewith. The inner face of the pulley 9 is provided with the interdentil openings 9ª, adapted with said ribs for coaction. In order to normally hold the pulley 9 inward, causing said interdentil openings to engage with said ribs, I employ the spring 11, coiled around the shaft 5 at the opposite end of the pulley 9 and between the same and the outer bearing of the shaft. Said spring has sufficient power to thrust the pulley inward upon its shaft in the absence of the action of the friction-cones; but when said cones are thrust inward between the disk 8 and said pulley the latter will be forced outward away from engagement with the ribs 10 and enable said cones to impart a reverse movement to said pulley.

It will be seen that an operating rod or rope 23, of any preferred material, may be attached to the upper end of lever 20, and said lever may thus be operated from a near or remote distance, rendering the device especially valuable in mining regions, where it is common to control the engine from a point high upon the derrick.

When the rod or rope 23 is released, a spring 24, attached to the lower end of the lever 19, will draw said end toward the standard 2, while in like manner the upper end of the lever 20 is connected to the standard 3 by means of the spring 25, the tension of which will act and draw said lever toward said standard.

From the foregoing description it will be seen that the pulley 9, in the absence of the action of the friction-cones, will travel or rotate with its shaft, but that the cones, when interposed between the disk 8 and said pulley, will force the latter outward and overcome the tension of the spring 11 and enable the pulley, by friction-contact with the cones, to be reversely rotated. This operation of reversing the movement of the pulley 9, it will be understood, reverses the movement of the machinery actuated by the engine, and the operation may be easily, promptly, and reliably performed as often as may be required without reversing or disturbing the movement of the engine proper.

Having thus fully set forth the advantages, operation, and construction of my invention and illustrated the same, I will state that what I claim as new, and desire to secure by Letters Patent, is—

1. The herein-described reversing mechanism for engines consisting of the disk 8, fixedly secured to the driving-shaft; a driving-pulley loosely mounted on said shaft; ribs preferably integrally formed with said shaft and adapted to engage with interdentil openings on the inner end of said pulley; a spring encircling the shaft and bearing against the outer end of the pulley; friction-cones for entering between said disk and pulley, and means for causing said cones to approach and recede from each other, substantially as described and for the purpose named.

2. In a reversing mechanism for engines the combination with the driving-shaft having a disk fixedly secured thereto of a pulley loosely mounted on said shaft; a clutch for connecting said pulley with said shaft; a bearing-block mounted on said shaft intermediate said disk and pulley; shafts fixedly secured to said bearing-block at their inner ends; standards for supporting the outer ends of said shafts that they will lie in the same plane; sleeves loosely mounted on said shafts; cones rotatably attached to said sleeves; operating-levers pivotally connected to said sleeves and adapted to reciprocate said cones upon said shafts and means, substantially as described, for effecting a simultaneous movement of said levers, as and for the purpose set forth.

3. As an improvement in reversing mechanism for engines the combination with the driving-shaft of a bearing-block attached thereto and supporting the inner ends of shafts 13; friction-cones mounted upon said shaft and consisting of the conical head, a neck connected to said head and terminating in an annular flange or collar; a sleeve cooperating with said cone and provided with inwardly-extending fingers for engagement with said collar permitting said cone to have a rotating movement when in an operative position, substantially as described and for the purpose named.

In testimony whereof I affix my signature in presence of two witnesses.

GEORGE A. SQUIRE.

Witnesses:
IRA H. SQUIRE,
M. J. SQUIRE.